3,686,114
PROCESS FOR PREPARING A DISPERSION OF
POLYMER PARTICLES IN AN ORGANIC
LIQUID
Morice William Thompson, Maidenhead, and Derek John Walbridge, Slough, England, assignors to Imperial Chemical Industries Limited, London, England
No Drawing. Continuation-in-part of application Ser. No. 568,113, July 27, 1966. This application Mar. 6, 1970, Ser. No. 17,337
Int. Cl. C08f 47/20; C08j 1/46
U.S. Cl. 260—34.2                9 Claims

ABSTRACT OF THE DISCLOSURE

A process for making a dispersion of polymer particles in an oragnic liquid. Monomer is polymerized in the liquid and, in an initial seed nucleation stage, seed particles are formed. As polymerization proceeds, relatively few additional particles are formed, but the seed particles grow in size. Then, during a re-nucleation stage, a second group of particles is formed. As the process continues, groups of particles grow. Consequently, the initial particles are bigger than those formed during nucleation. The dispersion has, as a result, families of particles of different sizes.

---

This is a continuation-in-part of prior U.S. application Ser. No. 568,113, filed July 27, 1966, now abandoned.

This invention relates to processes of making dispersions of addition polymers in organic liquid and to solutions of polymers made therefrom.

Dispersions of synthetic polymers in organic liquid can be made by processes of dispersion polymerisation; in dispersion polymerisation processes monomers are polymerised in an organic liquid in which the monomers are soluble but in which the resulting polymer is insoluble, the insoluble polymer so produced being stabilised in the form of disperse particles in the organic liquid by a stabiliser comprising an anchoring component which is associated with the surface of the particles and a pendent chain-like component which is solvated by the organic liquid and provides a stabilising sheath around the polymer particles. The solvated chain-like component may be a polymeric chain or a relatively shorter chain of as few as 12 or 15 co-valently linked atoms in length. In order to be solvated by the organic liquid, this component should be of a degree of polarity similar to that of the liquid. The anchoring component is relatively non-solvated by the organic liquid and may be a polymer of nature similar to that of the disperse polymer and associated therewith by the London or Van der Waal interaction or it may be a component, polymeric or non-polymeric, containing polar or di-polar groups and associated with the dispersed polymer by specific interaction with complementary polar or dipolar groups therein.

Where the stabiliser is associated with the disperse polymer particles by the London or Van der Waal interaction it may be a block or graft copolymer of which one polymeric component is associated with the polymer particles and another polymeric component of different polarity is solvated by the liquid of the dispersion. The stabiliser may be added as such to the polymerisation mixture or it may be formed in situ by adding a stabiliser precursor, i.e. a compound which comprises the solvated group and which can copolymerise with a minor part of the monomer to form the stabilising block or graft copolymer. This in situ formation of the stabiliser takes place in the organic liquid and so thereafter, as is the case when the stabiliser is added as such, the organic liquid contains a stock of stabiliser which is available for association with and stabilisation of fresh polymer surface as this latter is formed. Such block or graft copolymer stabilisers and dispersion polymerisation processes making use of them are described in British patent specification No. 941,305 and in U.S. patent specifications Nos. 3,095,388, 3,317,635 and application Ser. No. 476,201 now U.S. Pat. No. 3,514,500.

Dispersion polymerisation processes in which the stabiliser is associated with the disperse polymer particles by specific interaction of polar groups are descibed in U.S. patent application Ser. No. 886,777 which is a continuation in part of abandoned applications Ser. Nos. 525,315 and 653,631.

By means of such dispersion polymerisation processes it has been possible to produce stable, free-flowing dispersions containing up to 60% by volume of dispersed polymer, but at higher percentages volumes of polymer the dispersion was found to become dilatant.

In the dispersion polymerisation processes as previously described the major part of the stabiliser used in the pocess is added or made in situ at an early stage of the process. There is thus provided a reserve of stabiliser which is subsequently consumed as polymerisation is continued to produce more disperse polymer. In these processes most of the polymer particles are produced in the early stage of the polymerisation when only a few percent of the monomer has been polymerised to form a phase of very small nuclei particles having a diameter of the order of 100 A. or 1,000 A.; this early stage is termed the nucleation or "seed" stage. The major part of the polymer subsequently produced is formed in or deposited on the surface of these very small nuclei or seed which in consequence remain the same in number but grow in size, hence the alternative term "seed stage" for the initial nucleation stage. In this way dispersions containing up to 50% by volume of polymer of remarkably uniform small particle size, e.g. 0.1–1$\mu$ diameter, can be obtained. The uniformity in size is due to the initially very small nuclei being formed all at about the same time and then growing at approximately the same rate. Where the dispersions are to be used as a basis for dispersion-type coating compositions such dispersions of uniformly small polymer particles are particularly useful.

We have now found other uses which call for polymer dispersions of even higher solids content but in which the range and absolute value of particle size may be of little importance.

We have also found that dispersions of stabilised polymer particles in organic liquids of high solids content, i.e. dispersions containing more than 60% and as much as 75%, or, in favourable circumstances, even as much as 80% by volume of stabilised polymer can be produced as free-flowing liquids if the polymer particles are present in different sizes, the major proportion of the polymer being in larger particles and the minor proportion in smaller particles which will occupy interstices between larger particles. Preferably at least 70% of the polymer is in particles of average size at least 5 and preferably 10 times greater thna the average size of the remaining 30%. When the dispersion contains distinguishable "families" of particle sizes then preferably these families provide 50–70 parts of polymer in the size range 80–120 units, 20–30 parts in the size range 10–15 units, 8–12 times in the size range 2–3 units, and optionally 5–7 parts in the size range less than 0.5 unit. The value of the unit of size in such a system can, of course, be varied, but for some uses a convenient value is 0.1–0.5$\mu$. Where the very highest solids contents are not required, the third "family" in such systems is also optional, i.e. a simple system of only two sizes may be used, the size ratio in this case being not less than 5:1.

Such dispersions may be made by mixing suitable proportions of conventional dispersions of polymer particles of different sizes, but this involves a subsequent reduction of the proportion of liquid phase, for example, by evaporation, to increase the solids content to more than 60% by volume. We have now found, however, that the high solids dispersions may be made directly by processes of dispersion polymerisation in which there is an initial nucleation stage and at least one subsequent re-nucleation stage during the polymerisation in which subsequent stage or stages new polymer particles are formed. The re-nucleation may occur in one or more separate stages or in an extended stage and may be achieved in several ways.

One of these involves making a dispersion of polymer in organic liquid by dispersion polymerisation of monomer in the liquid, the first stage of which is a nucleation stage in which seed polymer particles are formed and then grow in size; this is followed by at least one other stage, a re-nucleation stage, in which further seed polymer particles are formed and then grow in size. The polymer particles formed and grown in the first stage are, at the beginning of the subsequent stage, larger than the seed particles formed in that subsequent stage. Since both the old particles and the new particles grow in the subsequent stage there are, at the end of it, two different sizes of particles. If a further re-nucleation and growth stage is then carried out, the two sizes of particles present at the beginning of the further stage continue to grow and so at the end of the further stage there are three different sizes of particles.

Another process involves following the first nucleation stage with an extended re-nucleation stage during which new particles are continuously formed as nuclei and grown. This type of process results in a wide spread of particle sizes, the largest being those formed at the first stage and continuously grown throughout the process and the smallest being those formed towards the end of the process with correspondingly little opportunity for growth.

Usually, feeding of monomer during the polymerisation is involved since when polymer solids contents of greater than 60% by volume are required it usually is not possible to run the dispersion polymerisation with all the corresponding amount of monomer added at the beginning.

Re-nucleation by the formation of new polymer particles during the course of a dispersion polymerisation can take place by increasing the activity of the stabiliser, and if activity is defined as the product of concentration and efficiency it will be seen that re-nucleation can be induced by:

(1) increasing the concentration of stabiliser, or
(2) increasing its efficiency, this latter involving either:

(a) decreasing the solvent power of the liquid phase of the dispersion during the polymerisation so that the stabiliser component, being less solvated, has a greater tendency to become associated with new insoluble polymer particles, or
(b) using a stabiliser with an even more insoluble anchor component with the same result as in (a), or
(c) modifying the nature of the disperse polymer being formed so as to increase its affinity for the anchor component.

The first method (1) is illustrated by a process in which a conventional substantially uniform size polymer dispersion containing from 30–45% by volume of polymer is produced, this being followed by a further stage in which the stabiliser or stabiliser precursor content of the dispersion is increased and further monomer is fed in to induce re-nucleation, this further stage optionally being again repeated at least once. Where the process involves three further stages of re-nucleation it is convenient to use in each of the initial and three further stages approximately equal parts of monomer, the total monomer charge being sufficient to produce a total polymer content of more than 60% by volume. This type of process is illustrated in Example 1.

In a variation of this method, re-nucleation in the further stages is aided by adding a more efficient stabiliser as described in 2(b) above. It will be seen that by these multi-stage methods there can be produced dispersions containing at least three "families" of particle sizes. The family of largest particles will be those produced in the conventional seed stage of the first stage on which polymer has been deposited throughout substantially the whole of the polymerisation. The family of next largest particles will be those produced in the first re-nucleation and on which polymer will have been deposited during the remainder of the polymerisation. The family of smallest particles will be those produced in the last re-nucleation.

In such a system there may even be a fourth family of particle sizes, the average size of the particles in the families being in the proportions earlier described.

In method 2(a) good use can be made of the fact that many polymers are soluble in their monomers and that in consequence the presence of unsaturated monomer dissolved in the continuous phase of a polymer dispersion tends to raise the solvent power of the continuous phase for the dispersed polymer and stabiliser. Method 2(a) is, therefore, illustrated by a process in which, in a first stage of the polymerisation, the reaction is started with a mixture containing from 40% to 60% by weight of monomer together with stabiliser or stabiliser precursor, initiator and, if desired, chain transfer agent. Substantially the whole of this monomer is polymerised and there is then added, together with further stabiliser or stabiliser precursor, the remaining monomer required to produce at least 60% by volume of polymer, this monomer being added continuously or in a series of steps. The critical feature in this process is the use of at least 40%, and preferably at least 50%, by weight of the monomer in the first stage in order to promote continuous re-nucleation in that stage, this re-nucleation resulting from the decrease in solvent power of the liquid phase as the monomer is consumed. This is followed by further re-nucleation during the monomer addition when stabiliser or stabiliser precursor is also added. Such a process gives a substantially continuous spectrum of particle sizes in the final dispersion. This type of process is illustrated in Example 2.

In an alternative procedure, in a first stage of the polymerisation monomer is fed into the dispersion polymerisation at a rate sufficiently high to maintain during the first part of the polymerisation a concentration at least 20% of free monomer in the liquid of the dispersion. Because of this high concentration of monomer the solvent power of the liquid is high and the efficiency of the stabiliser is correspondingly low leading to production of coarse particles and low usage of stabiliser. In the latter stage of the polymerisation when the feed of monomer ceases, the concentration of free monomer falls as it is consumed, consequently the solvent power of the liquid falls and continuous re-nucleation occurs. Monomer can be polymerised in this way to produce a dispersion containing about 40% to 50% by volume of polymer of a very wide range of particle sizes, further monomer and stabiliser or stabiliser precursor then being fed to produce at least 60% by volume of polymer as described in the preceding method. This type of process is illustrated in Example 3.

Method 2(c) involves modifying the nature of the disperse polymer being formed so as to increase its affinity for the anchor component of the stabiliser and thereby increase the efficiency of anchoring. For example, where the anchor component contains a polar group, a polar group may also be introduced into the polymer being formed by addition of a co-monomer containing a polar group which will enter into a specific reaction with the polar group of the anchor component. Where the anchor component contains, say, a carboxyl group then a carboxyl group may also be introduced into the disperse polymer, the resulting hydrogen bonding between the carboxyl groups leading to an increase in anchoring efficiency. Similar results may be achieved by any other polar groups such as hydroxyl or amide which will form hydrogen bonds. This process is particularly useful in dispersion polymerisations in which the stabiliser is made in situ, i.e. by copolymerising a minor portion of the main monomer with a precursor to provide the anchor component. In this case if, say, a carboxyl-containing monomer is added to the dispersion polymerisation when re-nucleation is desired, then carboxyl groups will be introduced into both the disperse polymer and the anchor component of the stabiliser.

Alternatively, where a preformed stabiliser containing a polar group is used then efficiency of anchoring may be increased by introducing into the disperse polymer a complementary polar group which will react with the anchor component. For example, the polar and complementary polar groups may be acidic and basic groups, the protolytic reaction between such groups resulting in higher anchoring efficiency of the stabiliser. Where the anchor component of the stabiliser contains carboxyl groups, then amine groups may be introduced into the disperse polymer. In general, suitable acidic and basic groups are as defined by Bronsted and Lowry, i.e. an acidic group is a species tending to lose a proton and a basic group is a species having a tendency to add on a proton.

As an alternative to re-nucleation by forming new polymer particles in the course of the dispersion polymerisation, re-nucleation may be achieved by adding nuclei as such to the dispersion polymerisation. For example, a part of the initial seed stage may be reserved and added part-way through the dispersion polymerisation. As a further alternative a dispersion polymerisation may be carried out using as a "seed" a mixture of coarse and fine particles on which to grow further polymer. However, since the coarse particles will themselves usually be prepared by dispersion polymerisation on a seed of fine particles, the process as a whole can be regarded as a dispersion polymerisation from an initial phase of fine seed particles in which re-nucleation is achieved by adding a further phase of fine seed particles during the polymerisation after the first seed has been grown to coarse particles.

By the processes of this invention dispersions containing large particles of diameter 10–100μ and over can be produced, in which case the size range in the dispersion can be as high as 1000:1. In general, the absolute size of the particles will depend on the amount of polymer grown on to the nuclei and the only practical limitations are that with particles above 100μ in diameter, sedimentation is rapid, and with particles below 0.1μ in diameter the stabilising sheath constitutes a significant part of the effective volume of the particles.

The processes of this invention are generally applicable to the preparation of high solids dispersions of addition polymers by dispersion polymerisation of ethylenically unsaturated monomers. For example, dispersions of polar polymers and copolymers of acrylic and methacrylic acid and nitriles, amides and lower (up to $C_4$) esters thereof, vinyl acetate, vinyl chloracetate, vinyl chloride, vinylidene chloride and vinyl ethers may be made by polymerising the monomer or a mixture of monomers in a non-polar liquid such as an aliphatic or aromatic hydrocarbon in which the polymer is insoluble. Similarly dispersions of non-polar polymers and copolymers, for example, of styrene, vinyl toluene, butadiene, isoprene, ethylene and higher fatty esters of unsaturated acids and of unsaturated alcohols such as lauryl methacrylate and vinyl stearate may be made by polymerising the monomer or a mixture of monomers in a polar organic liquid such as lower alkanols, short chain ketones and lower esters, in which the polymer is insoluble.

In the stabiliser for the dispersed polymer the solvated component should be of polarity similar to that of the liquid of the dispersion. A simple test of solvatability by any particular liquid is that the component by itself before attachment to the anchoring component should be completely soluble in that liquid.

Where the liquid is mainly aliphatic hydrocarbon in nature e.g. pentane, hexane, heptane or octane, the following are examples of suitable chain-like components which would be solvated by the liquid:

polymers of long chain esters of acrylic or methacrylic acid, e.g. stearyl, lauryl, octyl, 2-ethyl hexyl and hexyl esters of acrylic or methacrylic acid;
polymeric vinyl esters of long chain acids, e.g. vinyl stearate;
polymeric vinyl alkyl ethers;
polymers of ethylene, propylene, butadiene and isoprene;
long chain fatty acids and polymers of hydroxyl-containing long chain fatty acids.

Where the liquid is mainly aromatic hydrocarbon in nature, e.g. xylene and xylene mixtures, benzene, toluene and other alkyl benzene and solvent naphthas, similar components may be used and, in addition, shorter chain analogues, e.g. polymers of ethoxy ethyl methacrylate, methyl methacrylate, and ethyl acrylate or ethyl celluloses. Other solvatable components suitable for use in this type of liquid include aromatic polyethers and polycarbonates and polymers of styrene and vinyl toluene.

Where the liquid is weakly polar in nature e.g. a higher alcohol, ketone or ester, suitable solvatable components include:

aliphatic polyethers;
polyesters of short chain acids and alcohols;
polymers of acrylic or methacrylic esters of short chain alcohols; and
polymers of hydroxyl-containing short chain acids.

Where the liquid is strongly polar in nature, e.g. methyl or ethyl alcohol, suitable solvatable components include polymers of acrylic or methacrylic acid, ethylene oxide or vinyl pyrrolidone, and hydroxylated polymers, e.g. polyvinyl alcohol or polymers of glycol mono-methacrylates.

The anchor component of the stabiliser is relatively non-solvated by and therefore usually of different polarity to that of the liquid. When the anchor component is polymeric is can, therefore, be of similar nature to that of the insoluble disperse polymer.

The general principles of dispersion polymerisation are described in more detail in the Patent Specifications referred to earlier.

The processes of this invention are particularly useful in that they provide a means of producing more polymer per unit volume of polymerisation plant. In addition, since the dispersions are still free-flowing liquids, problems of reaction rates and heat transfer are much reduced as compared with bulk and solution polymerisation processes. In addition the high solids polymer dispersions made by the process of this invention provide advantage in their uses.

For example, because of their relatively low content of non-solvent organic liquid they can readily be converted into solutions of polymers simply by adding a strong solvent. Because of their low content of non-solvent organic liquid there is no need to remove any of this as described in our U.S. patent application Ser. No. 436,305 and yet the polymer solutions will still be of relatively high solids content, e.g. 20% or more and will possess the same useful properties, e.g. improved solution characteristics and better application properties when formulated into coating compositions. For example, dispersions of polymethyl methacrylate, ethyl acrylate, or vinyl acetate, in aliphatic hydrocarbon containing more than 65% polymer by volume can be converted to solutions simply by mixing with a strong solvent such as aromatic hydrocarbons, e.g. toluene and xylene, lower esters, e.g. ethyl, butyl, or β-ethoxy ethyl acetate, and ketones, e.g. acetone, methyl ethyl ketone or methyl isobutyl ketone. Because of the ease with which polymers and copolymers of esters of acrylic and methacrylic acids may be dissolved this invention provides a particularly usefulfi route to solutions of this group of polymers.

Further, the polymer dispersions made by process of this invention may be converted to high solids plastisols by adding a plasticiser and removing the original non-solvent liquid of the dispersion, e.g. by low temperature vacuum distillation. If the plasticiser is one which does not attack or swell the polymer at low temperature then the dispersion, by reason of the size distribution of the disperse particles, will still be free-flowing at correspondingly high solids.

If the dispersion is to be converted to polymer powder by evaporation of the liquid continuous phase then the high solids dispersions of this invention have the advantage that they contain relatively small proportions of liquid to be evaporated.

The high solids dispersions can also be converted to fibers or films by extrusion and evaporation of non-solvent.

The invention is illustrated by the following examples.

EXAMPLE 1

Stage I

A conventional polymer dispersion of about 40% solids by volume was made by refluxing the following mixture for two hours:

| | Parts by wt. |
|---|---|
| Methyl methacrylate | 500 |
| Azodiisobutyronitrile | 2 |
| Stabiliser precursor (30% solids) | 13.3 |
| 10% solution of primary octyl mercaptan in petrol | 25 |
| Aliphatic hydrocarbon (boiling range 70–90° C.) | 500 |

The precursor was a solution in aliphatic hydrocarbon (boiling range 110–140° C.) of a random copolymer of lauryl methacrylate/glycidyl methacrylate (97/3) reacted with methacrylic acid to introduce approximately one methacrylate double bond per molecule of copolymer.

The polymer particles of the dispersion were of substantially uniform size, about 5μ diameter.

Stage II

Refluxing of the dispersion was continued and into the returning cold distillate was fed, over one hour, a mixture of:

| | Parts by wt. |
|---|---|
| Methyl methacrylate | 500 |
| Azodiisobutyronitrile | 4.0 |
| Precursor solution (as above) | 26.6 |
| Mercaptan solution (as above) | 25 |

Refluxing was continued for a further hour after completion of the feed. At this stage the polymer content of the dispersion was about 57% by volume and the polymer particles fell into two size ranges, one of about 0.1μ in diameter and another of about 6–7μ.

Stage III

Stage II was repeated. The dispersion then contained 67% by volume of polymer distributed over three size ranges of about 0.1μ, 1–2μ and 7–8μ.

Stage IV

Stage II was again repeated. The dispersion then contained 73% by volume of polymer distributed over four size ranges of about 0.1μ, 0.5–1μ, 2μ and 8–9μ. This dispersion was still a free-flowing liquid.

EXAMPLE 2

Stage I

The following mixture was refluxed for 2 hours:

| | Parts by wt. |
|---|---|
| Methyl methacrylate | 600 |
| Azodiisobutyronitrile | 2.4 |
| Precursor solution (as above) | 16 |
| Mercaptan solution (as above) | 20 |
| Aliphatic hydrocarbon (boiling range 70–90° C.) | 362 |
| Toluene | 38 |

The resulting dispersion contained about 50% polymer by volume, the particle sizes ranging from 1μ to about 200μ.

Stage II

Refluxing of the dispersion was continued and into the returning cold distillate was fed over 2 hours a mixture of:

| | Parts by wt. |
|---|---|
| Methyl methacrylate | 1,000 |
| Azodiisobutyronitrile | 4 |
| Precursor solution (as before) | 50 |
| Mercaptan solution (as before) | 50 |

Refluxing was continued for a further hour to complete the polymerization.

The product was a dispersion containing about 70% by volume of polymer in particles having a very wide size distribution of 0.1μ to about 200μ.

The dispersion was very fluid and was readily converted into a clear solution by pouring it into an equal weight of a stirred mixture of toluene and acetone (3:1 by weight) at room temperature. The polymer solution can be used as a basis for a pigmented acrylic laquer with improved application properties as described in the last-mentioned patent application.

EXAMPLE 3

Stage I

Into 600 parts by weight of refluxing aliphatic hydrocarbon of boiling range 70–90° C. was fed over two hours a mixture of:

| | Parts by wt. |
|---|---|
| Methyl methacrylate | 1,400 |
| Azodiisobutyronitrile | 5.6 |
| Precursor solution (as before) | 28 |
| Mercaptan solution (as before) | 73 |

The resulting polymer dispersion was refluxed for a further hour and at the end of that time contained about 59% by volume of polymer in particles ranging from 0.1μ to about 35μ in diameter.

Stage II

Refluxing was continued and into the returning cold distillate was fed over 2 hours a mixture of:

| | Parts by wt. |
|---|---|
| Methyl methacrylate | 400 |
| Azodiisobutyronitrile | 1.6 |
| Precursor solution (as before) | 8 |
| Mercaptan solution (as before) | 21 |

After refluxing for another hour the dispersion contained about 64% polymer by volume.

Stage III

Stage II was repeated using a mixture of:

| | Parts by wt. |
|---|---|
| Methyl methacrylate | 800 |
| Azodiisobutyronitrile | 2.4 |
| Precursor solution (as before) | 12 |
| Mercaptan solution (as before) | 31.5 |

At this stage the polymer content was about 72% by volume in particles of diameter ranging from 0.1μ to about 40μ.

The dispersion was a free-flowing liquid.

The aliphatic hydrocarbon in the dispersion was replaced by an equal volume of α-methyl cyclohexanyl phthalate by adding the phthalate and then distilling off the aliphatic hydrocarbon at 25–30° C./10 mm. pressure. This produced a fluid plastisol of solids content equivalent to that of the original dispersion. This was converted by heating at 80–100° C. to a homogeneous mass with no bubbling due to evaporation of volatile solvent.

EXAMPLE 4

Stage I

A polymer dispersion of about 37% solids by volume was made by refluxing the following mixture for two hours:

| | Parts by wt. |
|---|---|
| Methyl methacrylate | 424.6 |
| 2-ethoxy ethyl methacrylate | 36.9 |
| Azodiisobutyronitrile (100%) | 1.846 |
| p-Octyl mercaptan (100%) | 1.039 |
| Stabiliser precursor (as in Example 1) (32% solution) | 14.42 |
| Aliphatic hydrocarbon (boiling range 770–90° C.) | 500.00 |

The polymer particles of the dispersion were of substantially uniform particle size, about 4μ in diameter.

Stage II 67.32 parts of the above stabiliser precursor were then added, followed by a feed over two hours of a mixture of:

| | Parts by wt. |
|---|---|
| Methyl methacrylate | 495.4 |
| 2-ethoxy ethyl methacrylate | 43.1 |
| Azodiisobutyronitrile | 2.154 |
| Mercaptan (as above) | 1.212 |
| Stabiliser precursor (as above) | 16.83 |

The charge of stabiliser precursor gave rise to re-nucleation of particles which at the end of Stage II had a diameter of about 0.2μ. The original family of particles by then were of about 5μ in diameter.

Stage III

A mixture of:

| | Parts by wt. |
|---|---|
| Methyl methacrylate | 920.0 |
| 2-ethoxy ethyl methacrylate | 80.0 |
| Azodiisobutyronitrile | 4.0 |
| Mercaptan (as above) | 2.25 |
| Stabiliser precursor (as above) | 31.25 | was fed in over two hours. Refluxing was continued for a further half an hour, by which time the particles had diameters of about 5.5μ and 0.4μ. The large particles constituted 73% by weight of the total disperse polymer.

The total solids by volume was 66% and over shear rates encountered in normal liquid flow has a viscosity of about 3 poises. The polymer has a molecular weight of 120,000.

EXAMPLE 5

Initial charge

| | Parts by wt. |
|---|---|
| Aliphatic hydrocarbon (boiling range 70–90° C.) | 120.0 |
| Aliphatic/aromatic hydrocarbon (boiling range 170–210° C.) | 117.0 |
| Preformed graft stabiliser solution (33% solids) | 3.0 |
| Vinyl acetate | 55.0 |
| Azodiisobutyronitrile | 2.8 |

Feed 1

| | Parts by wt. |
|---|---|
| Vinyl acetate | 300.0 |
| Preformed graft stabiliser solution (33% solids) | 40.0 |
| Azodiisobutyronitrile | 1.1 |

Feed 2

| | Parts by wt. |
|---|---|
| Vinyl acetate | 160.0 |
| Azodiisobutyronitrile | 0.5 |

Feed 3

| | Parts by wt. |
|---|---|
| Vinyl acetate | 300.0 |
| Preformed graft stabiliser solution (33% solids) | 72.0 |
| Azodiisobutyronitrile | 1.5 |

The stabiliser was a random copolymer of polymethyl methacrylate/methacrylic acid (49:1) attached thereto as side chains, an equal weight of a self-ester of 12-hydroxystearic acid of molecular weight about 1500, the stabiliser being dissolved in a mixture of petrol, ethyl acetate, butyl acetate (4:1:1).

The initial charge was mixed and refluxed for 30 minutes. The solution whitened within 10 minutes after reaching reflux. Feeds 1, 2 and 3 were then metered in successively, each at a constant rate over two hours, one hour and two hours respectively. The final charge was refluxed for one hour at the end of the feed stages.

The final dispersion had a viscosity of 1.2 poises and contained particles of sizes about 3μ, 0.3μ and 0.1μ. Because of its low viscosity and high polymer content, the dispersion provided an excellent base for formulation of dispersion coating compositions particularly suitable for brush application.

We claim:

1. A process of making fluid dispersions of particles of an addition polymer in an organic liquid in which said polymer is insoluble which comprises polymerizing ethylenically unsaturated monomer which is soluble in said organic liquid in the presence of a stabilizer which comprises an anchoring component which is associated with the surfaces of the dispersed polymer particles and a component which is solvated by said organic liquid in said organic liquid during an initial seed nucleation stage to form a first group of particles of said polymer, polymerizing said monomer on said first group of particles whereby they increase in size, forming a second group of particles by polymerizing said monomer in a subsequent seed nucleation stage in which the activity of said stabilizer is increased; the second group of particles thereby being smaller than the first group of particles whose size has been increased, and polymerizing additional quantities of said monomer on both groups of particles whereby they grow in size but the first group remains larger than the second group, the polymerization being continued until the dispersion contains at least 60% by volume of disperse polymer, at least 70% by volume of the polymer being in particles of average size at least 5 times greater than the average size of the remaining particles.

2. A process as claimed in claim 1 in which the activity of the stabilizer is increased by increasing the concentration of stabilizer used in the dispersion polymerization.

3. A process as claimed in claim 1 in which the activity of the stabilizer is increased by decreasing the solvent power of the liquid phase during the dispersion polymerization.

4. A process as claimed in claim 3 in which the decrease in solvent power is brought about by maintaining a concentration of at least 20% by weight of monomer in the liquid phase and polymerizing substantially all this monomer before adding more.

5. A process as claimed in claim 3 in which the decrease in solvent power is brought about by maintaining a concentration of 40–60% by weight of monomer in the liquid phase and polymerizing substantially all of this monomer before adding more.

6. A process as claimed in claim 1 in which the activity of the stabilizer is increased by adding a stabilizer having more insoluble anchor component.

7. A process as claimed in claim 1 in which the activity of the stabilizer is increased by addition of further monomer which when copolymerized in the disperse polymer increases its affinity for the anchor component of the stabilizer.

8. A process as claimed in claim 1 in which the activity of the stabilizer is increased by adding particles of polymer to the dispersion polymerization.

9. A process of making a solution of addition polymer which comprises mixing a dispersion of said addition polymer made by the process of claim 1 with a solvent for the polymer.

References Cited

UNITED STATES PATENTS

| | | | |
|---|---|---|---|
| 2,600,122 | 6/1952 | Meyer et al. | 260—34.2 |
| 3,095,388 | 6/1963 | Osmond et al. | 260—34.2 |
| 3,166,524 | 1/1965 | Schmidle et al. | 260—34.2 |
| 3,218,287 | 11/1965 | Schmidle et al. | 260—33.6 |
| 3,264,234 | 8/1966 | Osmond | 260—34.2 |
| 3,317,635 | 5/1967 | Osmond | 260—34.2 |
| 3,331,801 | 7/1967 | Osmond et al. | 260—34.2 |
| 3,382,297 | 5/1968 | Thompson | 260—34.2 |

FOREIGN PATENTS 958,023   5/1964   Great Britain _____ 260—34.2

ALLAN LIEBERMAN, Primary Examiner

U.S. Cl. X.R.

260—29.1 R, 33.6 PQ, 33.6 UA

UNITED STATES PATENT OFFICE
CERTIFICATE OF CORRECTION

Patent No. 3,686,114     Dated August 22, 1972

Inventor(s) Morice William Thompson, et. al.

It is certified that error appears in the above-identified patent and that said Letters Patent are hereby corrected as shown below:

Column 1, after line 11, insert -- Claims priority, application Great Britain, July 29, 1965, 32492/65 -- .

Signed and sealed this 1st day of May 1973.

(SEAL)
Attest:

EDWARD M. FLETCHER, JR.
Attesting Officer

ROBERT GOTTSCHALK
Commissioner of Patents